(12) United States Patent
Sellers et al.

(10) Patent No.: US 7,412,647 B2
(45) Date of Patent: Aug. 12, 2008

(54) METHOD AND SYSTEM FOR LAYING OUT PAGINATED CONTENT FOR VIEWING

(75) Inventors: Timothy D. Sellers, Bellevue, WA (US); Heather L. Grantham, Redmond, WA (US); Joshua A. Dersch, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 488 days.

(21) Appl. No.: 11/073,271

(22) Filed: Mar. 4, 2005

(65) Prior Publication Data

US 2006/0200752 A1 Sep. 7, 2006

(51) Int. Cl.
G06F 17/27 (2006.01)

(52) U.S. Cl. .................. 715/253; 715/243; 715/246; 715/251

(58) Field of Classification Search .................. 715/500, 715/517, 520, 525, 200, 243, 246, 251, 253
See application file for complete search history.

(56) References Cited

U.S. PATENT DOCUMENTS

| | | | |
|---|---|---|---|
| 6,760,485 B1 * | 7/2004 | Gilman et al. | 382/274 |
| 7,159,173 B2 * | 1/2007 | Trenz | 715/527 |
| 7,171,630 B2 * | 1/2007 | O'Leary et al. | 715/856 |
| 2002/0054300 A1 * | 5/2002 | Trenz | 358/1.2 |
| 2003/0117425 A1 * | 6/2003 | O'Leary et al. | 345/700 |
| 2006/0061816 A1 * | 3/2006 | Iwatani | 358/1.15 |

OTHER PUBLICATIONS

Courter et al., Mastering Microsoft Office 2000 Professional Edition, Published by SYBEX Inc. in 1999, pp. 56-59.*
Screen shot of Microsoft Word 2000, software released in 1999, pp. 1A-5A (screen shots created by the examiner on Sep. 28, 2007).*

* cited by examiner

*Primary Examiner*—Stephen Hong
*Assistant Examiner*—Gregory J Vaughn
(74) *Attorney, Agent, or Firm*—Workman Nydegger

(57) ABSTRACT

A method and system in a document viewing control for laying out an invisible page grid based on various criteria, including whether the pages of a document are fixed, contain reflowable content, whether the fixed pages are all the same size, and where the user has actively focused a page when a new layout needs to be generated, which may be anytime a user changes the number of pages to display. Upon such a change, a mechanism determines page sizes based on whether the focused page has flow or fixed content. A layout mechanism computes the grid based on the number of pages (columns) to display across. For documents with mixed-sized and/or mixed flow and fixed pages, rows of the grid are determined from the active page to the start of the document, and from the active page's row to the end of the document. The grid provides consistent viewing results.

20 Claims, 18 Drawing Sheets

METHOD AND SYSTEM FOR LAYING OUT PAGINATED CONTENT FOR VIEWING

FIELD OF THE INVENTION

The invention relates generally to computers, and more particularly to displaying content on a computer system.

BACKGROUND

One of the most common uses of computer systems is to display the content of documents. Contemporary computer systems and programs provide great flexibility in viewing a document, including jumping to hyperlinked locations in the document, zooming in and out of the content, allowing a user to jump to a desired page by indicating a desired page number, scroll and use keyboard keys to navigate the document, and perform many other document viewing options.

However, when displaying the pages of a document, there are different ways in which pages may be laid out relative to one another, and different ways in which content and/or pages may be handled. For example, there are various ways to align pages when showing multiple pages at the same time, (e.g., left, center or right horizontally aligned, and top, center or right vertically aligned). Moreover, there are fixed content pages, in which the content fits onto fixed page dimensions, and reflowable content pages, in which the content fills whatever page space is currently available, e.g., text wraps differently if the available page width expands or contracts.

Moreover, while in many documents the pages are all the same size, in other documents, there may be a mix of differently-sized pages, including in fixed-page-only documents, e.g., landscape and portrait pages. Reflowable content may be mixed with fixed page content in a given document, independent of whether the fixed pages are all the same size or not.

Still further, the user may change a layout at any time, such as to increase or decrease the number of pages being shown at once. The user may also have one actively-focused page among others being displayed, such as a page with which the user was interacting, e.g., by having marked text as selected for copying. If the user changes the number of pages, the user will expect to still see the actively focused page in the subsequent view having the modified number of pages.

In sum, there are many variations that are possible when laying out the pages of content of a document for display. What is needed is a mechanism that handles layout in a consistent and logical way, so that users receive a satisfying viewing experience regardless of viewing differently-sized pages, viewing fixed or reflowable (flow) content, e.g., HTML pages wherein when a browser window resizes, the content reflows to fit the available space, and regardless of which page is actively focused.

SUMMARY

Briefly, the present invention provides a method and system for laying out a grid of pages for the user to view and navigate when interacting with the document. When a user requests to see some number of pages at the same time, e.g., one page in a single column arrangement, two pages in a two column page arrangement, and so forth, the layout is regenerated by constructing a virtual (invisible to the user) grid of pages based on various criteria, including the number of pages (columns) to display at once, the page that has active focus at the time the request is made, and other criteria. The display is then updated based on the new page grid, and as the user navigates through the document, the viewing system uses the page grid to determine what pages to display.

In one implementation, the viewing system is provided in a document viewing control that is hosted by a computer (e.g., application) program to provide the program with document viewing functionality. The document viewing control displays content in its viewing area, referred to as a viewport, and provides mechanisms (user interface elements) that allow the viewer to interact with the content, e.g., scrolling, zooming, copying and so forth.

One choice that may be available to users is to select the number of columns to display. When this occurs, a layout control (e.g., contained in the document viewer control) lays out a page grid based upon a number of rules and logic, to ensure a consistent viewing experience given the many variations that are possible. In general, the layout control works to minimize background around pages (while keeping some visible background to visibly differentiate pages) and maximize page zoom when laying out multiple pages.

In the page grid, column widths are set based on the page width for each page in the row, and may vary across rows. Documents may include fixed content of pages that are all the same sized, or a mix of sizes. Other documents contain pages of reflowable content, in which the content fills whatever page space is currently available, e.g., text wraps differently if the available page width expands or contracts. Documents may also comprise a mixture of reflowable content and fixed pages.

In general, the layout component of the document viewing control sets the number of columns to the number of pages to be shown, and then starting with the actively focused page calculates the width (e.g., in pixels) of each page based on the available width of the viewport. From the width, the height is determined; the aspect ratio is locked.

One layout rule for fixed content pages is that when there is a mix of page sizes, the rows are each horizontally centered, including the last row in the document. Another layout rule is that a row height value is determined based on the tallest page in a row; the vertical alignment rule for pages is to top-align each page in a given row. For each row in the page grid, the column width is based on the page width; the width of each page determines each column width, not, and for example, the width of the largest column.

Reflowable content is arranged to fill whatever viewing space is available, and that space is variable in size. In general, reflowable content is used for text which automatically wraps based on the available width. The grid for reflowable content is made up of identically-sized cells extended uniformly across the entire document. With reflowable content, changing the number of pages displayed also reflows the content, but does not change the zoom percentage, and zooming in and out does not reflow the content. When zooming in and out, pages are added only when there is space available in the content area, and removed when space no longer exists for the page to be fit entirely in the content area.

When determining how to divide up the content area to display multiple pages as requested by a user, a single cell first determines whether the split should be horizontal or vertical based on the vertical and horizontal dimensions. Starting with one page filling the viewport, if the page width is greater than or equal to the page height, then the first split is vertical, otherwise the split is horizontal. Until the number of pages requested (or more) has been determined, this splitting process is repeated recursively, by selecting a just-split page, again determining the longest side, and splitting this side.

When dealing with a mix or reflowable and fixed content pages, in one implementation, each row in the page grid can have one type or the other, but not a mix within the row. Also, the pages are center aligned in the row. In general, the size of the pages displayed is based on the page containing the active focal point, which is either a default page such as the center (or first) page currently being shown, or the displayed page with which the user has most-recently interacted. If the active focal point is on a fixed page when the user requests a change that impacts the number of columns, then the new grid sizing is based on the fixed page's size, that is, flow pages will be set to the size of the fixed page. If the focal point is on a flow page, then the grid sizing is based on that flow page, which, as described above, may follow splitting.

When the user requests a change to the number of pages being displayed, the layout control checks for whether there are only fixed pages. If so, the layout is performed by a simple calculation that determines the page widths and rows based on the number of columns requested.

When there is a mix of fixed content pages and reflowable content pages, the page that currently has active focus is used to size the layout; if fixed, then that size is used for reflowable content pages as well. If the focused page is a reflowable content page, that page is split horizontally and/or vertically as necessary to achieve the desired number of pages, and then the fixed size pages are based on the size following splitting.

Once the sizing is known, the grid layout process operates by determining whether all of the pages are fixed and of the same size, or whether there is a mix of sizes, and/or flow and fixed content pages. If the document contains only fixed pages of the same size pages, a row entry is created to represent a row, and as many pages (columns) as requested are added to the row. Rows are added to the layout until all pages are arranged.

When there is a mix of sizes, and/or flow and fixed content pages in the document, the page with active focus is selected as the start of a "pivot row" from which rows of pages will be added upwardly to the start of the document and downwardly to the end. Pages are added to the pivot row to meet the requested number of columns, and the pivot row's width used to size other rows. Note however that a flow page is not allowed in the same row as a fixed page, and thus the row may be terminated and a new row started to avoid such a mix.

From the pivot row, previous rows are created to contain previous pages in the document until the start of the document is reached and no more previous pages remain. New rows are created and added whenever adding a page would cause the current row to exceed the width of the pivot row, or if a mix of a reflowable page and a fixed page would otherwise occur in the current row.

When no other previous pages remain unprocessed, the rest of the document's pages, starting from the page after the pivot row, are added to one or more rows downwardly until none remain. At this time, the layout grid is complete, and the document viewing control can now use it to display the pages, e.g., starting with the pivot row at the top of the viewport.

Other aspects will become apparent from the following detailed description when taken in conjunction with the drawings, in which:

DETAILED DESCRIPTION

Exemplary Operating Environment

Figure 1:
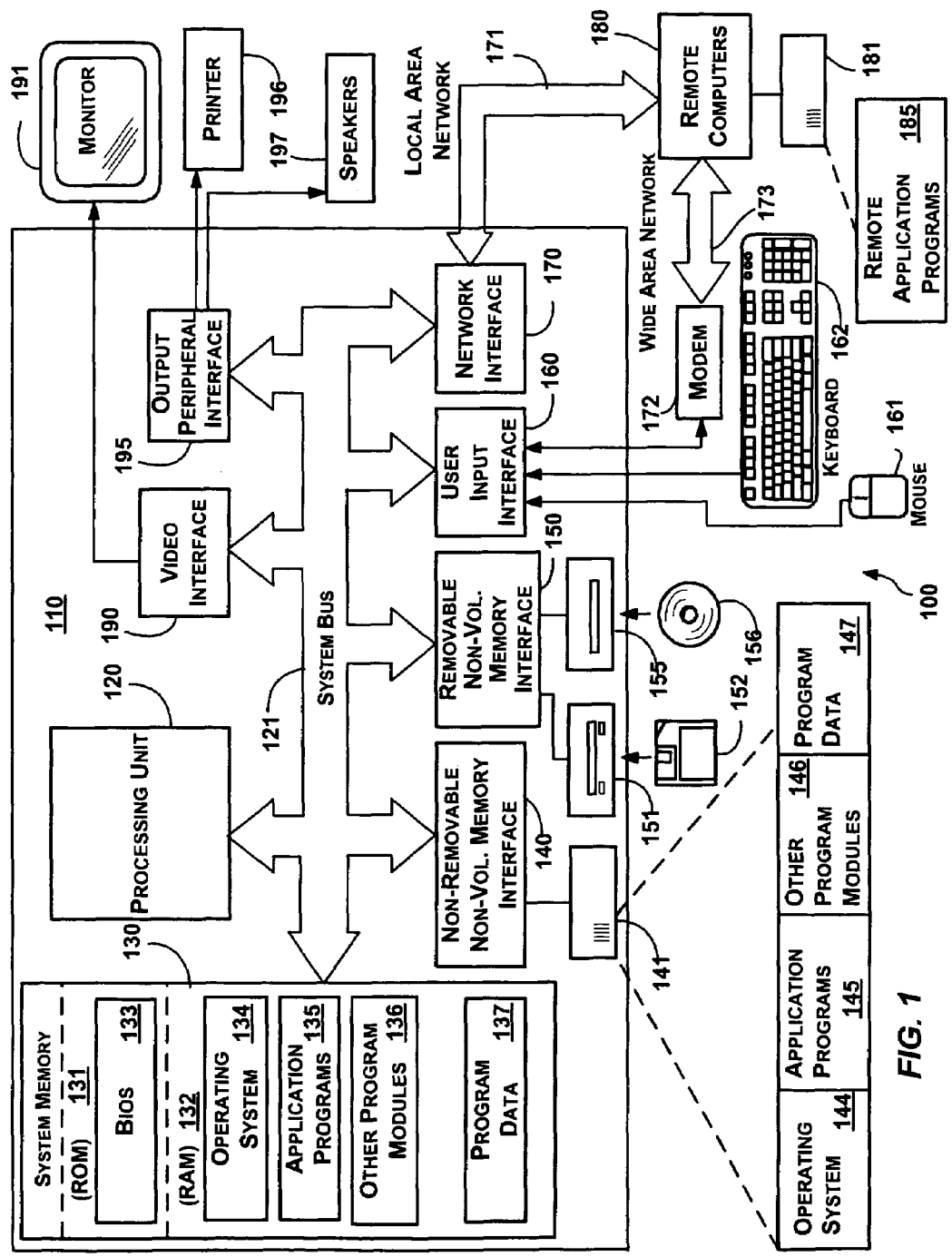
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Paginated Content Layout

The present invention is generally directed towards determining an arrangement of a document's pages for the user to view when navigating through the document. In addition to scrolling up and down and zooming in and out as is typical with conventional document viewers, a user may request to see some number of pages at the same time, e.g., one page in a single column arrangement, two pages in a two column page arrangement, and so forth. As will be understood, anytime the user makes such a change request, the layout is regenerated by constructing a virtual (invisible to the user) grid of pages based on various criteria, including the number of pages (columns) to display at once, the page that has active focus at the time the request is made, and other criteria, described below. Then, the display will be updated based on the new page grid, and the user will navigate through the document, with the system using the page grid to determine what pages to display.

As will be also understood, numerous ways to implement the present invention are feasible, and only some of the alternatives are described herein. For example, the present invention is primarily described below with reference to a control object model in which objects (that may contain other control objects) are hosted in an application program or the like. However, this is not necessary to the present invention, and, for example, any given program could implement similar logic directly, or via another mechanism, such as a library. As such, the present invention is not limited to any particular examples or implementations described herein, but rather may be used various ways that provide benefits and advantages in computing in general.

Figure 2:
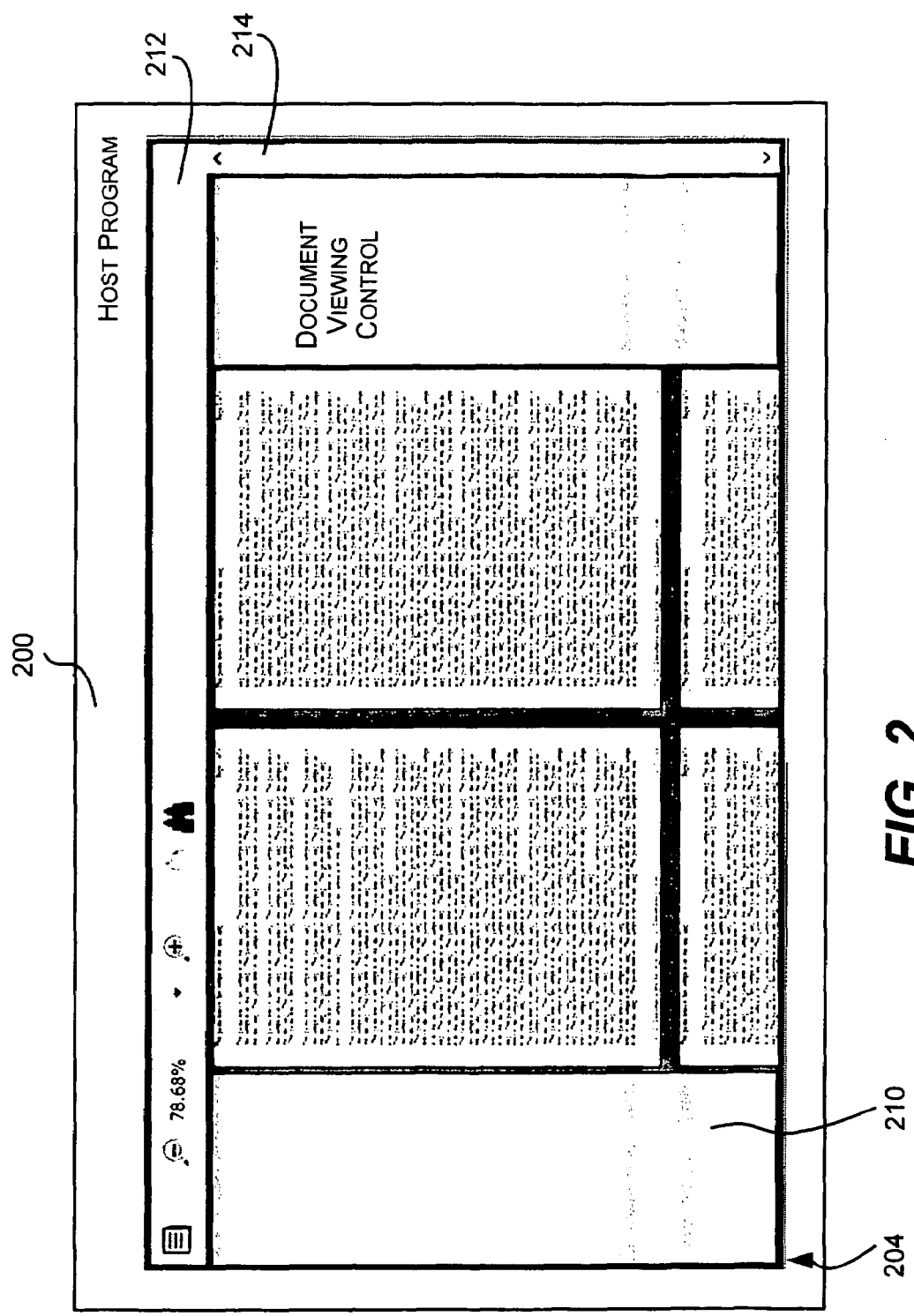
FIG. 2 is a block diagram representing an exemplary configuration in which a document viewing control may be hosted by a program, and in which the document viewing control may provide page layout in accordance with various aspects of the invention.

Turning to FIG. 2, there is shown a block diagram representing an exemplary configuration in which the present invention may operate in accordance with various aspects of the invention. The configuration includes a host (e.g., application) program 200 and a document viewing control 204 that displays content in its viewing area, referred to as a viewport 210, wherein as used herein, a document includes essentially any type of visible content, and thus may include text, graphics, animated text and/or graphics, and video, or any combination thereof. In general, pages are shown in a portrait-orientation, and the document viewing control 204 is configured as having a landscape viewport 210, although a portrait viewport is also described. The host program 200 comprises a computer program that executes on a computer system, such as the computer system 120 of FIG. 1, and may be a conventional application program, an operating system component or utility, another control, and so forth.

In addition to providing the viewport 210 with which to view documents, the document viewing control 204 may also display user interface elements, such as one or more icons on a toolbar 212 for accessing and modifying the way the document is viewed. For example, a user may zoom in and out by clicking on the appropriate icons, may select a desired zoom percentage from a dropdown list, and directly type in a desired zoom percentage value. Another choice that may be available to users is to select the number of columns to display, e.g., two columns in the displayed document of FIG. 2. Note that the user may actually request to see pages, rather than columns of pages, however the system treats the request as a column request in most situations (except when sometimes displaying multiple reflowable content pages in portrait mode, as described below). Further, in one implementation, a scrollbar 214 is provided that allows the user to change the current vertical position within the document, by scrolling with relatively fine control.

Figure 3:
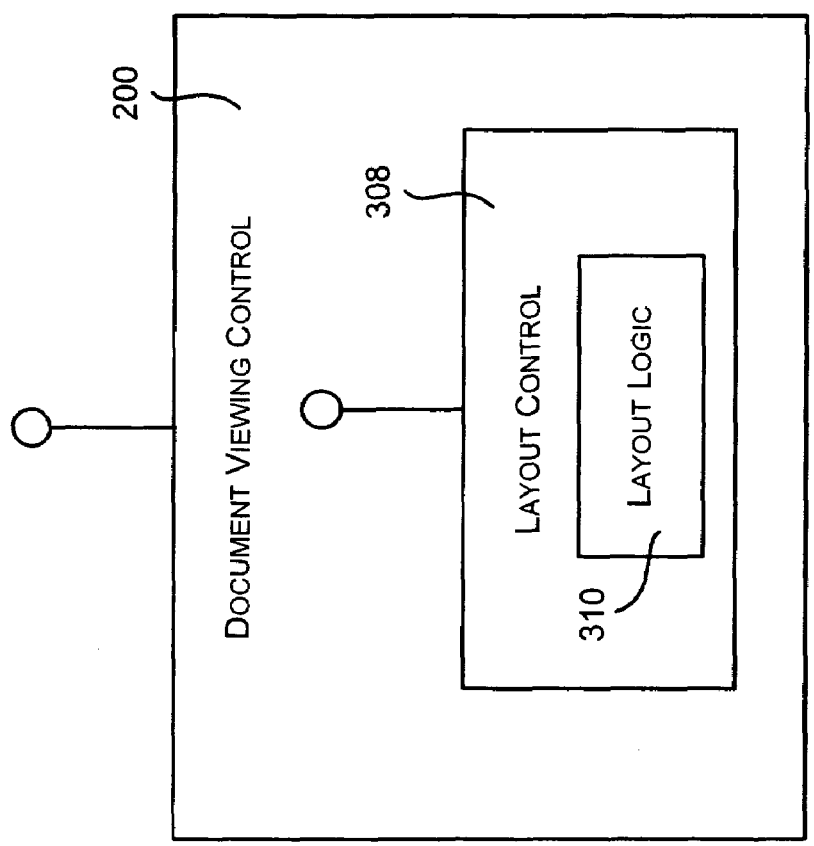
FIG. 3 is a representation of the document viewing control having an interface for hosting by a program, and containing a layout control including logic to provide consistent page layout in accordance with various aspects of the invention.

In one implementation, generally represented in FIG. 3, the document viewing control 204 comprises an object that may expose several properties and commands when instantiated, hosted and executed. The document viewing control 204 may provide its own methods, and may essentially contain other objects (e.g., other controls) to perform other functionality. For example, the document viewing control 204 may contain a layout control 308 that handles scrolling behavior via page layout logic 310 therein. Input from a pointing device into the document viewing control 204 via its toolbar 212 and 214 may be received at the layout control 308, such as via an interface called by the document viewing control 204. Keyboard input may be provided to the document viewing control 204 via an interface to the application program, and that keyboard input which involves layout (e.g., a number of pages to display) may be provided to the layout control 308 via its interface.

In accordance with an aspect of the present invention, the layout control 308 employs a number of rules and logic to ensure a consistent viewing experience given the many variations that are possible. In general, the layout control 308 works to minimize background around pages (while keeping some visible background to visibly differentiate pages) and maximize page zoom when laying out multiple pages.

In accordance with various aspects of the present invention, pages are laid out in storage in the page grid. Column widths are set based on the page width for each page in the row, and may vary across rows. The first page in each row is center aligned, with individual pages respecting left-to-right ordering for left for left-to-right layout, or a right-to-left ordering for right-to-left layout, which is selectable. Note that the first page in the last row is aligned to the left for a left-to-right layout, (and to the right for right-to-left layout) including when the last row does not have sufficient pages to fill each column. In one example implementation described herein, the pages in a row are top aligned vertically.

As described above, there are documents having fixed content, same-sized pages, e.g., documents created using a printer driver. Documents may also contain pages of reflowable content, in which the content fills whatever page space is currently available, e.g., text wraps differently if the available page width expands or contracts; developers use such pages to avoid creating static pages. Other types of documents by the document viewing control 204 comprise a mixture of reflowable content and fixed pages, e.g., when an occasional fixed page of content is inserted within reflowable content. The document viewing control 204 also supports having different size pages of fixed content in the same document.

To differentiate between the end of one page and the start of an adjacent page, vertical and horizontal spacing between pages in the page grid is provided, and can be any practical number of pixels, (although as can be readily appreciated, a setting of zero does not help in differentiation and a negative value would cause overlapping pages). The horizontal and vertical default sizes are ten pixels, and can be set independently. The spacing does not include the size of any page border. The horizontal and vertical spacing do not change when zooming in and out.

The page grid is centered both horizontally and vertically in the document viewer program window when the height of the document is less than the height of the viewport; note that the viewport can be considered as zooming and scrolling vertically and horizontally around the page grid to show different sections of the page grid. In the example of FIGS. 4-10, the dashed lines represent the page grid; although not shown in other drawing figures, such a grid is present, although not visible to the user.

Figure 4:
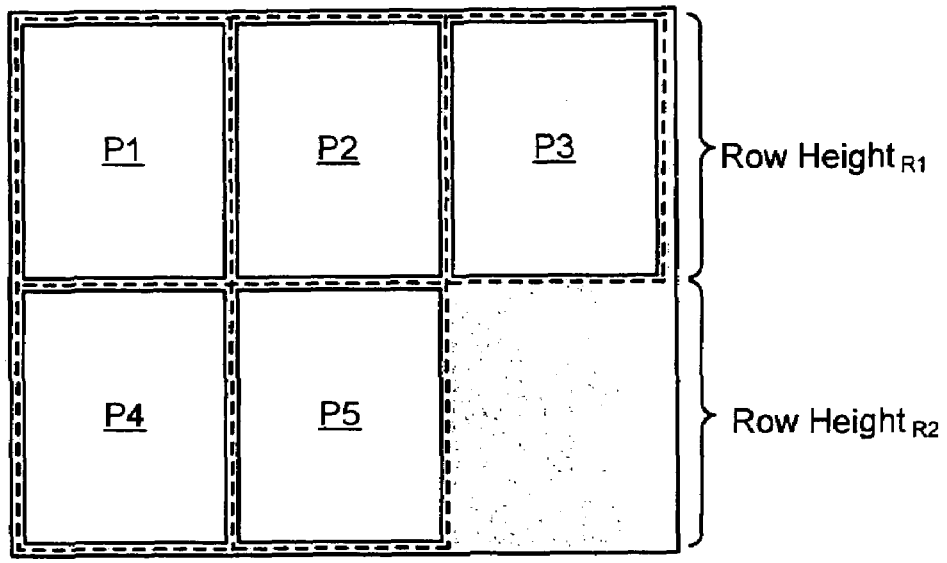
FIGS. 4-10 comprise various representations of pages laid out in accordance with various aspects of the invention, to highlight alignment for fixed content, and some alternatives.

FIG. 4 is a representation of a layout grid in the when the user has requested to see three pages of content, when viewing a document having fixed pages, all of the same size. In general, the layout component 308 of the document viewing control 204 sets the number of columns to the number of pages to be shown, and then calculates the width (e.g., in pixels) of each page based on the available width of the viewport 210. From the width, the height is determined; the aspect ratio is locked. In the example of FIG. 4, the pages are equal size, and thus the pages each receive one-third of the viewport's space, after accounting for spacing. As can be seen in FIG. 4, the last row is left justified for left-to-right layout.

Figure 5:
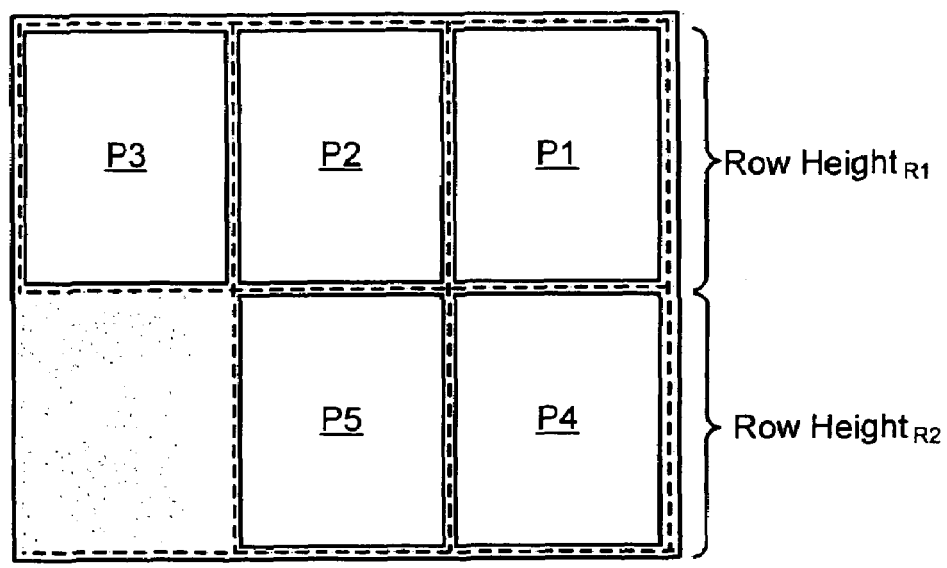

FIG. 5 shows a similar grid calculation to that of FIG. 4, except that FIG. 5 shows a right-to-left layout. Note the last row is right-aligned, and the direction of the page numbers, P1-P3 and P4-P5 is right to left.

Figure 6:
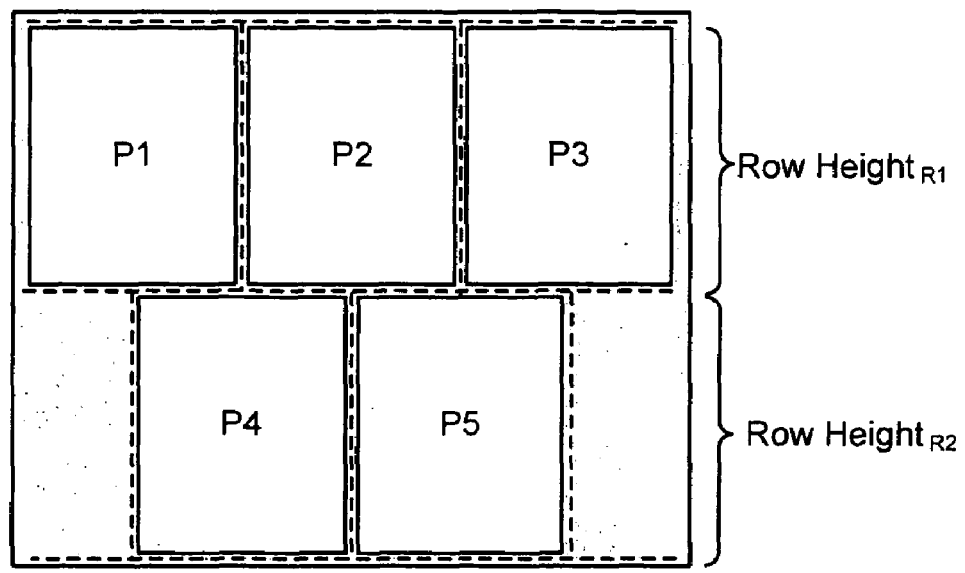
Figure 7:
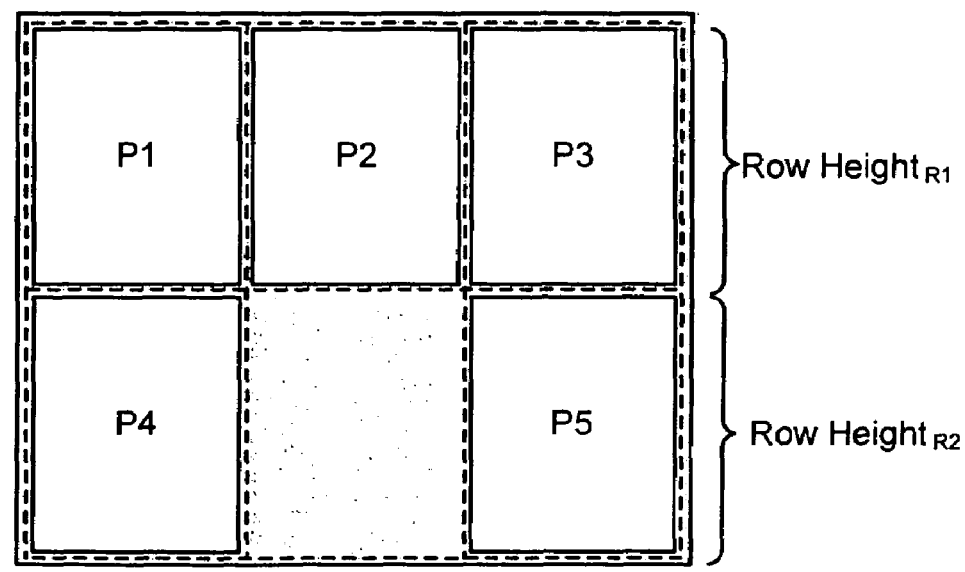

FIGS. 6 and 7 show alternative arrangements for fixed pages of the same size, in left-to-right layout. Although in one implementation such alignments would violate the align-left alignment rules for left-to-right layout, (because in FIG. 6 page P4 should be aligned under P1, and in FIG. 7, page P5 should be aligned under page P2), these are feasible layouts for alternative implementations.

Figure 8:
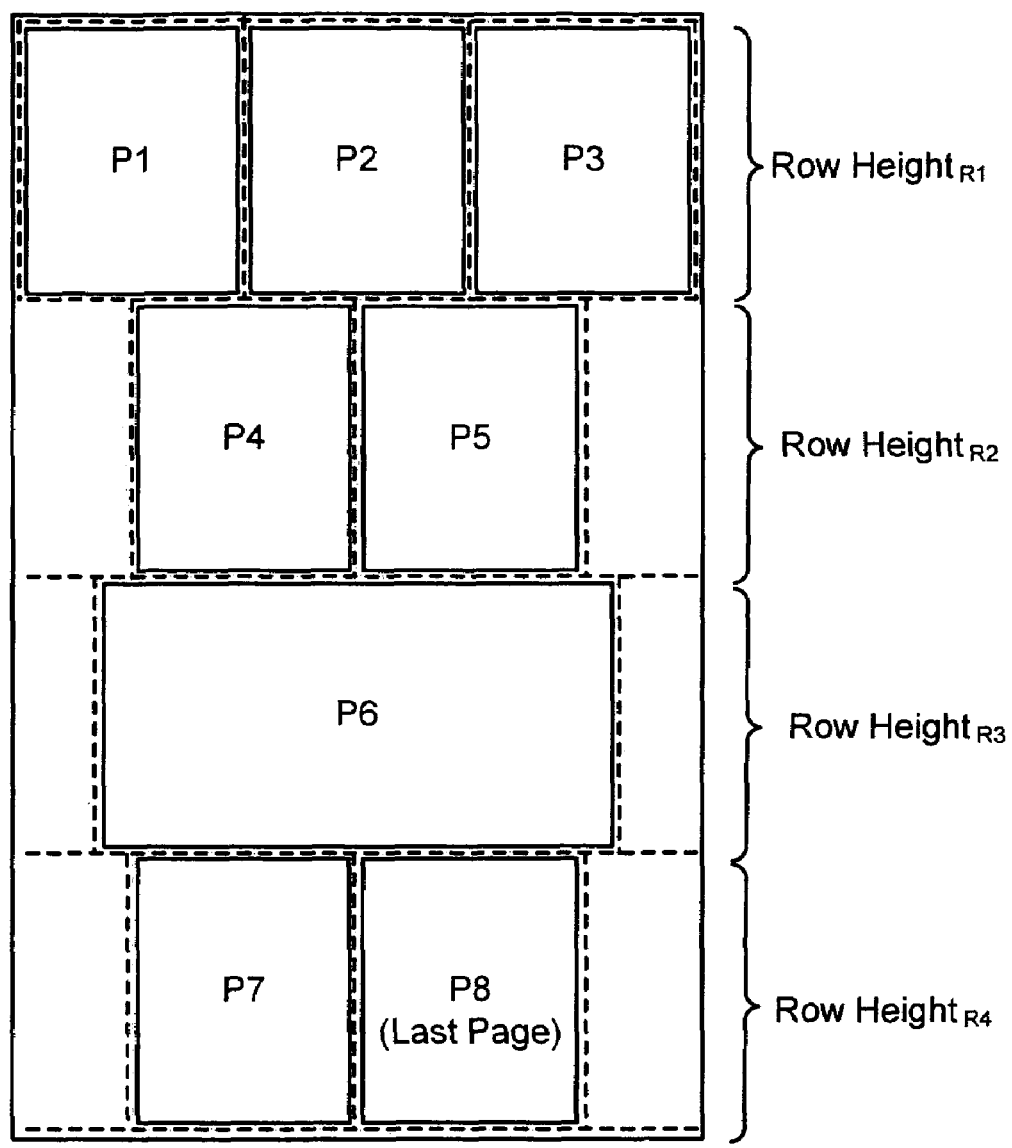
Figure 9:
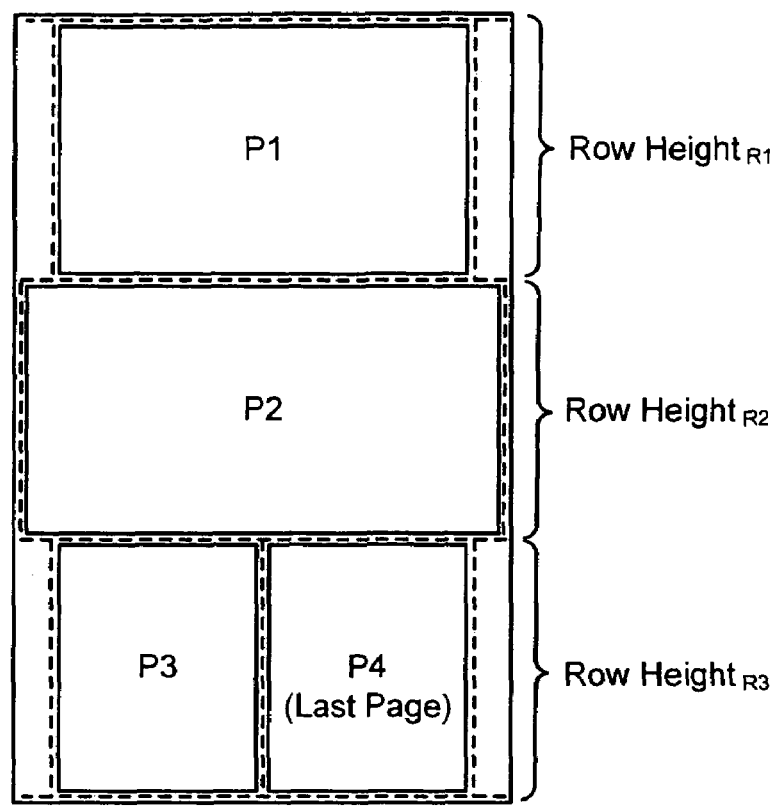
Figure 25:
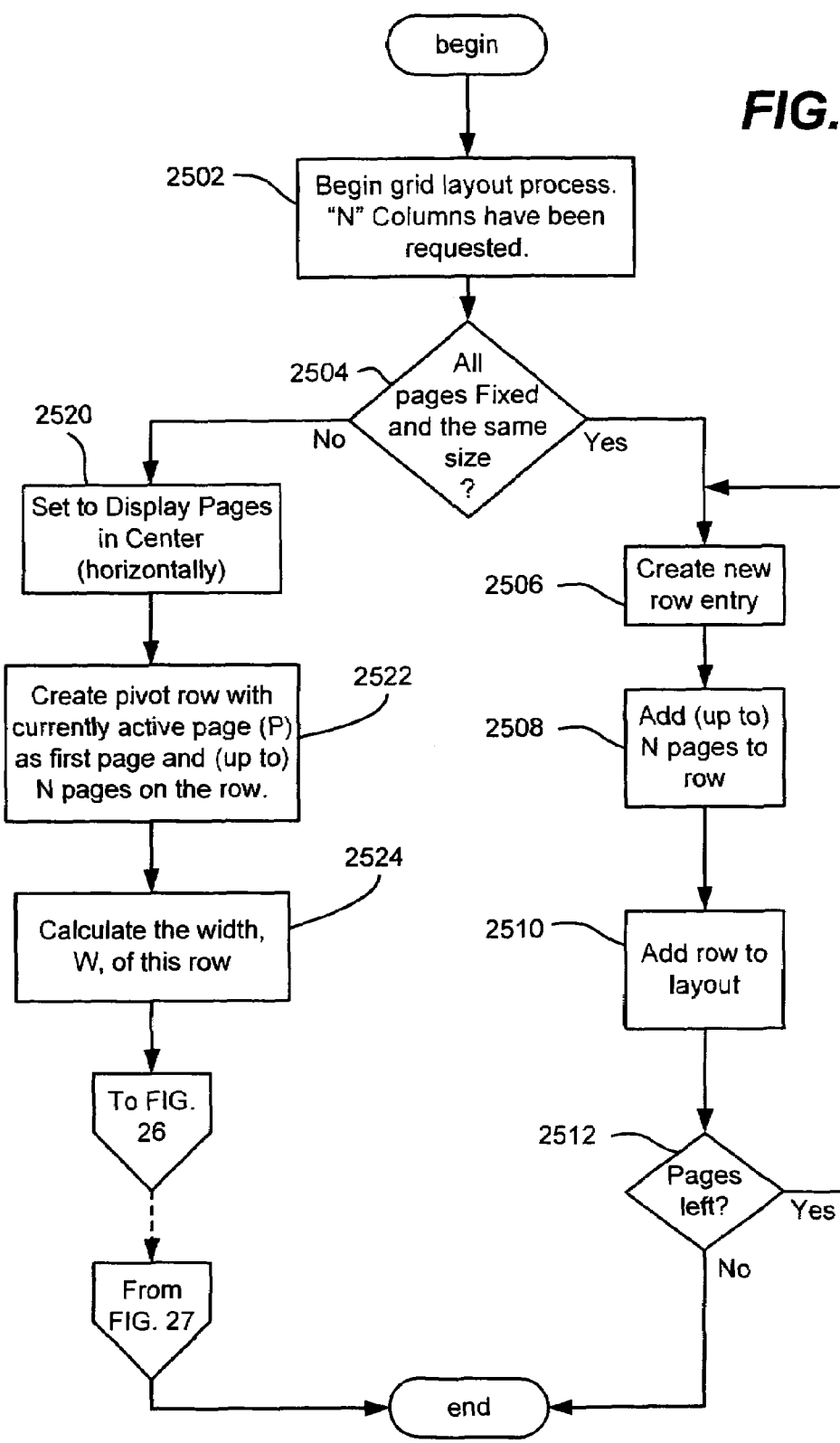
FIGS. 25-27 comprise a flow diagram for laying out pages in rows and columns, when a user request causes a layout from a focal point, in accordance with various aspects of the invention.
Figure 26:
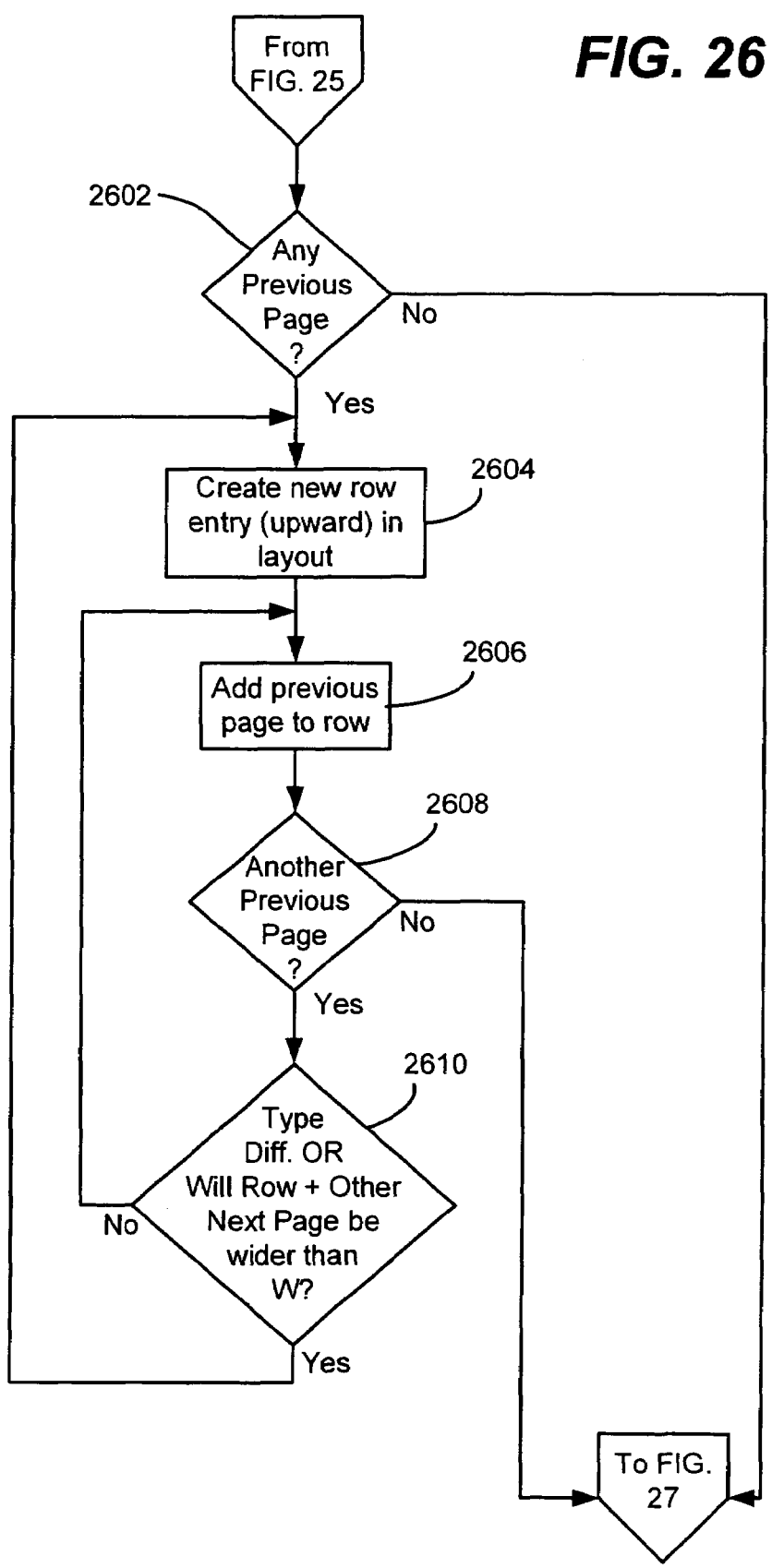
Figure 27:
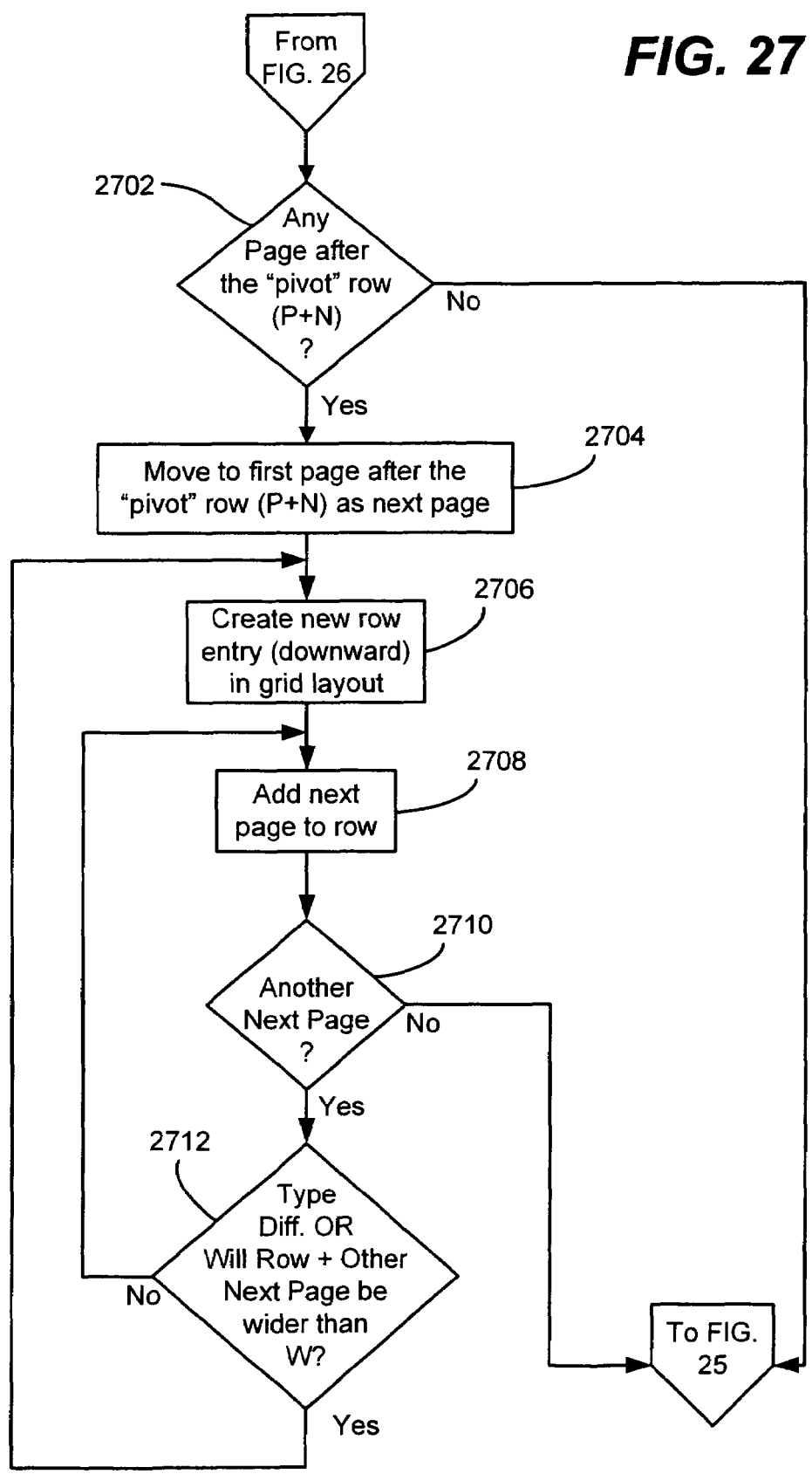

FIG. 8 is a representation of a left-to-right page grid layout of fixed content pages, in which there is a mix of page sizes. Note that by mixed sizes, it is meant that there is a difference in any one dimension, e.g., a document containing a portrait-oriented 8½-by-11 pages and a single landscape-oriented 8½-by-11 page is considered as having mixed sizes, even though the size in area of all pages is the same. In one implementation, where there are mixed size pages, the rows are each centered. Note that similarly in FIG. 9, all rows are centered, including the last row in the document (containing page P4), since there are mixed size pages. FIGS. 25-27, described below, provide example logic for laying out such page grids.

Figure 10:
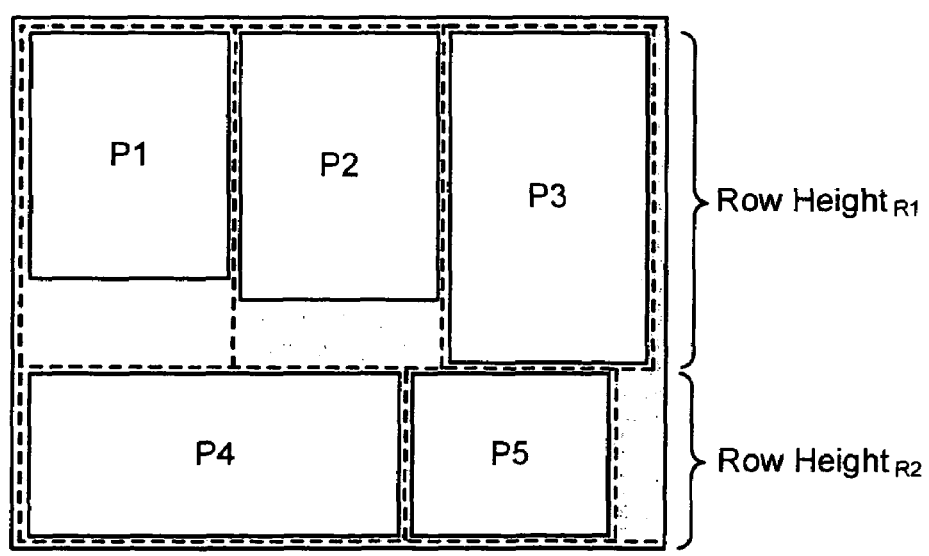

Another layout rule is that a row height value is determined based on the tallest page in a row. FIG. 10 shows an example of this, in which pages P1-P3 are in the same row, but have different heights, with the largest height, that of page P3, being the row height. Note that the vertical alignment rule for pages is to top-align each page in a given row, and thus P1 and P2 are top-aligned with page P3 in FIG. 10. Notwithstanding, in other implementations, other vertical alignment rules may be used.

Figure 11:
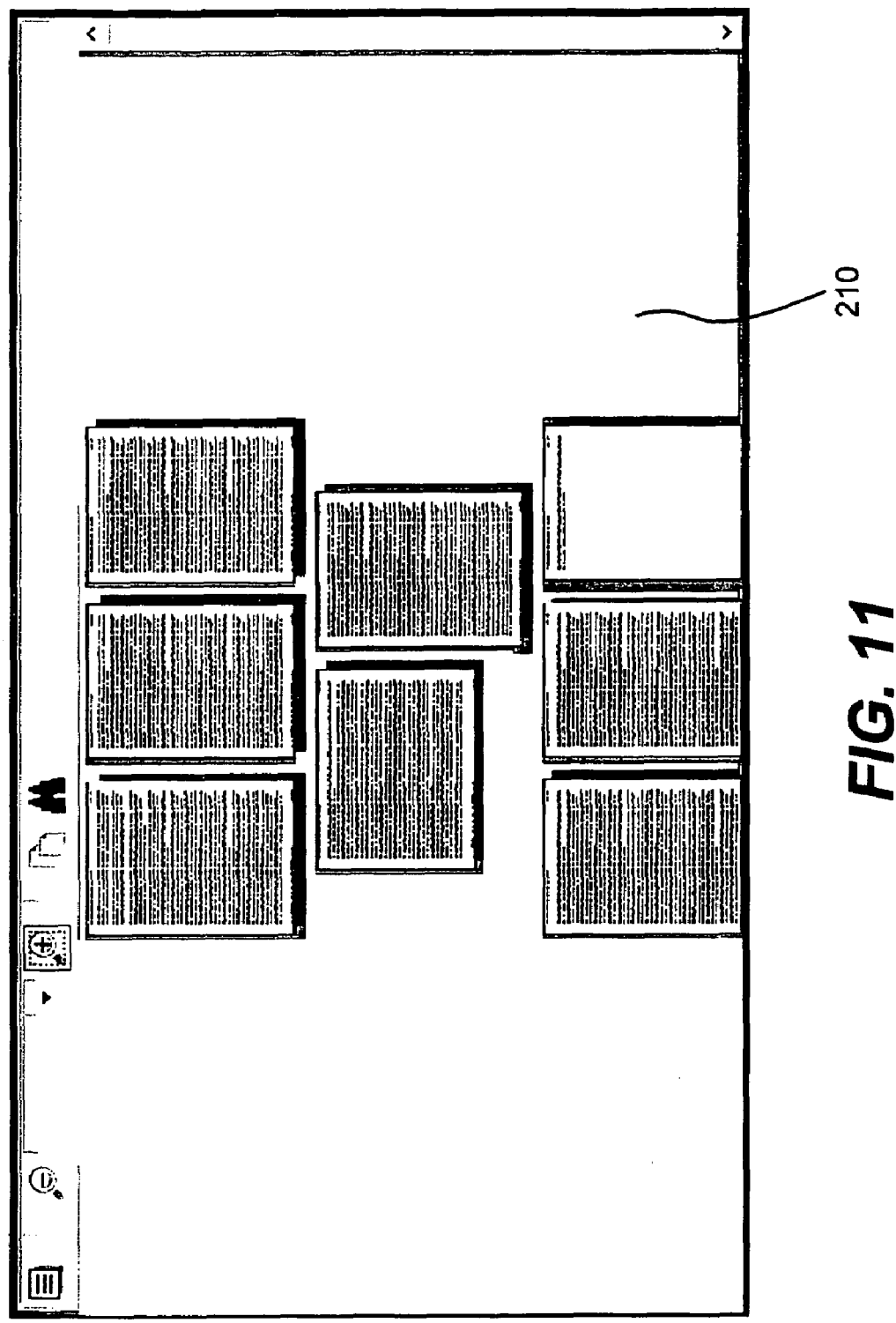
FIG. 11 is a screen shot showing pages laid out when differently-sized pages are present in a document, in accordance with various aspects of the invention.

FIG. 11 shows an actual display of pages in the viewport 210 that summarizes the rules described above with reference to FIGS. 8-10. As can be seen in FIG. 11, the user has requested three rows be shown, and then zoomed out. The second row has a row height based on the tallest page, and the pages are top-aligned in this row. Horizontally, the pages are center-aligned because there is a mix of page sizes.

Figure 12:
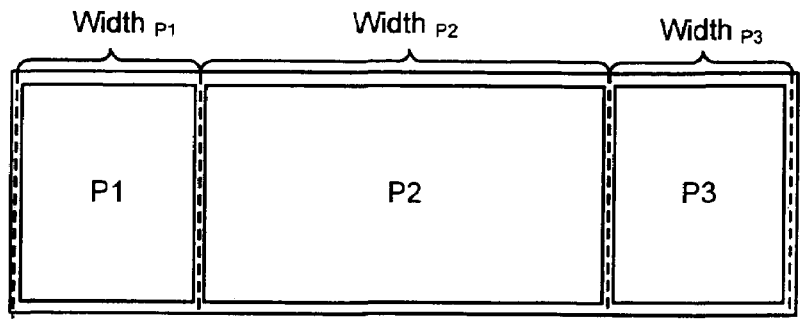
FIGS. 12-14 are representations of various layouts showing pages laid out when pages have different widths, and an alternative layout, in accordance with various aspects of the invention.
Figure 13:
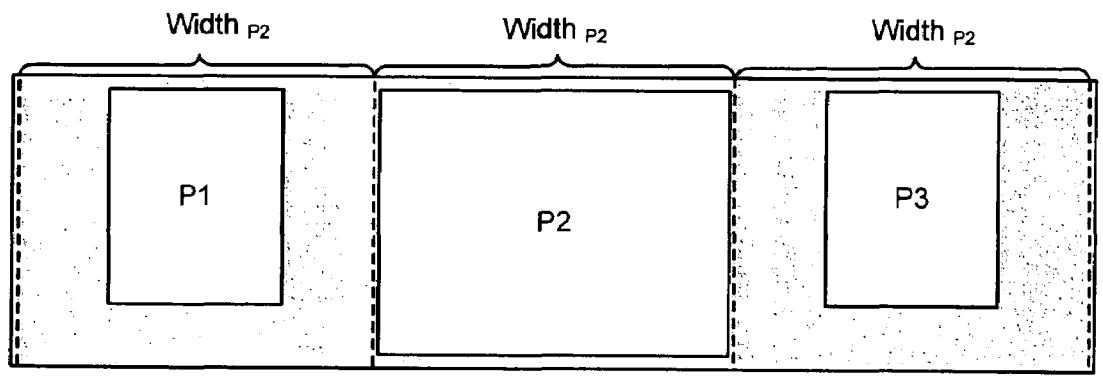

Turning to an explanation of columns, column width is page-based. For each row in the page grid, the column width is based on the page width. FIG. 12 shows the correct layout, in which the width of each page determines each column width. In contrast, FIG. 13 shows an incorrect layout, in which the column widths in the row are equal to the width of the largest column, instead of being based on the individual page widths. Again, however, such a "widest-column" layout may be provided in an alternative implementation.

Figure 14:
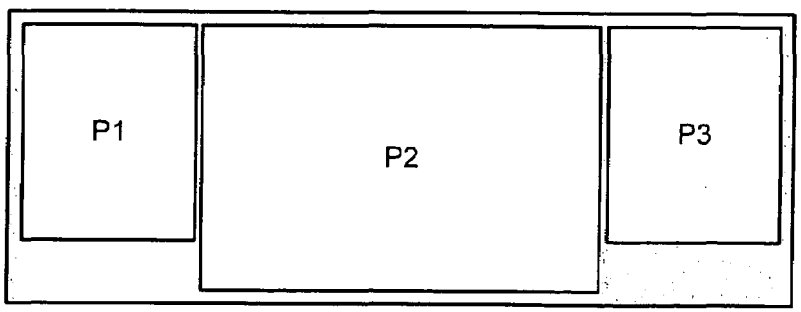

FIG. 14 again shows that the pages are vertically top-aligned in a row, regardless of differing column widths of the pages in that row. Notwithstanding, other vertical alignments are possible, e.g., center aligned pages, or bottom aligned pages, or something else such as stepping down.

Figure 15:
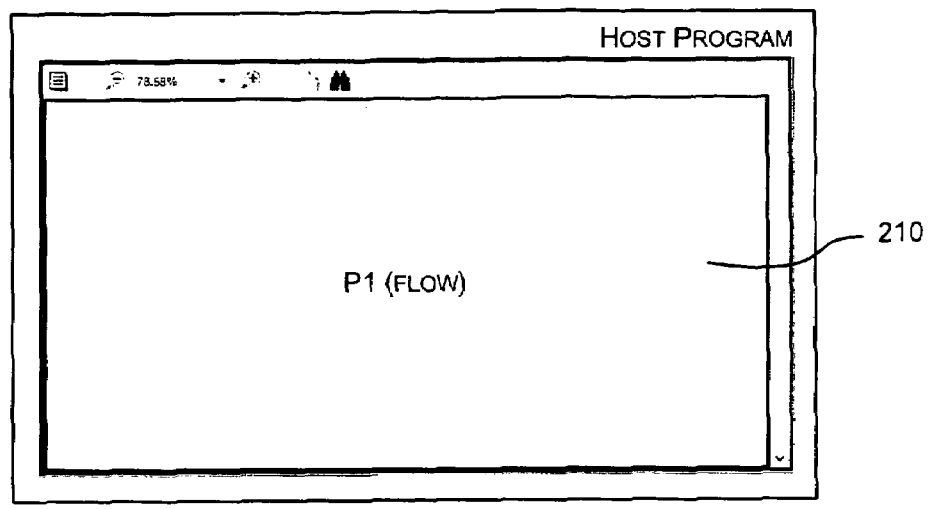
FIGS. 15 and 16 are representations of layouts when a document contains at least one page of reflowable content, in accordance with various aspects of the invention.
Figure 16:
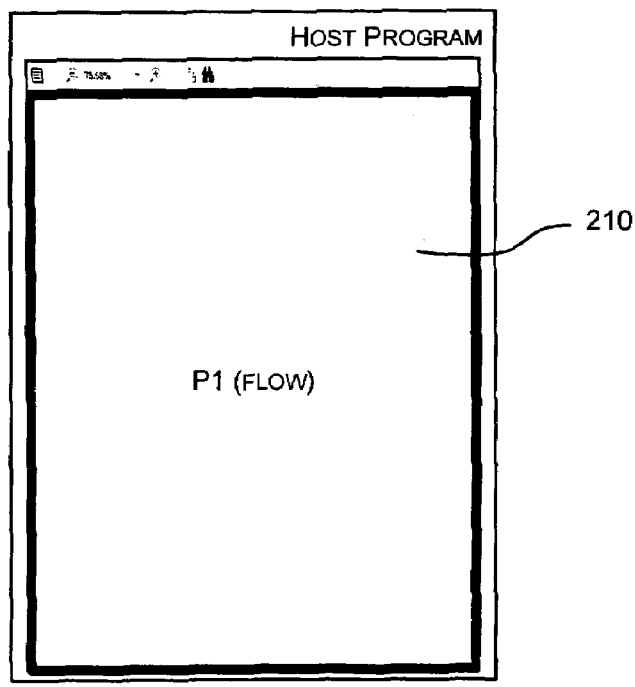

Turning to an explanation of pages with reflowable content, essentially reflowable content will fill whatever viewing space is available, and that space is variable in size. In general, reflowable content is used for text which automatically wraps based on the available width (in Western languages). FIGS. 15 and 16 show two different orientations of the document viewing control 204's viewport 210, with reflowable content in each. As used herein, reflowable content is shown as lightly gray-shaded boxes, to contrast them from fixed content, shown in white background boxes.

The grid for reflowable content is made up of identically-sized cells extended uniformly across the entire document. The amount of reflowable content displayed on the page is based on the page size and zoom percentage. With reflowable content, changing the number of pages displayed also reflows the content, but does not change the zoom percentage. Zooming in and out does not reflow the content. When zooming in and out, pages are added only when there is space available in the content area, and removed when space no longer exists for the page to be fit entirely in the content area. This means that there are no horizontal scroll bars when viewing multiple flow pages.

When determining how to divide up the content area to display multiple pages as requested by a user, a single cell first determines whether the split should be horizontal or vertical. Starting with one page filling the viewport, if the aspect of the page is landscape (page width is greater than height), then the first split is vertical. If instead the aspect was portrait, (page width is less than height) then the split is horizontal. In the case where both horizontal and vertical sides are equal, the split is vertical. Until the number of pages requested (or more) has been determined, this splitting process is repeated recursively, by selecting a just-split page, again determining the longest side, and splitting this side.

Figure 17:
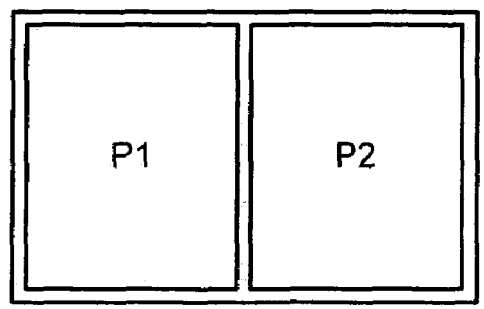
FIGS. 17-19 are representations of various layouts when a document contains pages of reflowable content, and a user requests multiple columns be shown, in accordance with various aspects of the invention.
Figure 18:
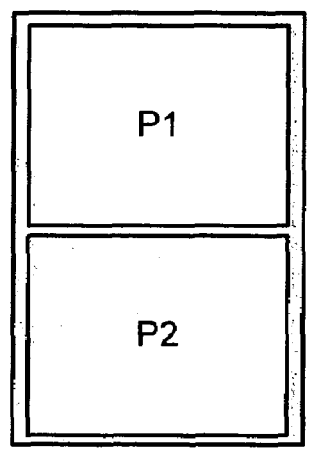

For one flow page, the flow page aspect is the same as the content region, as represented in FIGS. 15 and 16. For a landscape content region as in FIG. 17, for an example split into two pages, the longest side is split into two equal lengths, resulting in two portrait flow pages. For a portrait content region as in FIG. 18, for an example split into two pages, the split is horizontal, resulting in two landscape flow pages, one above the other.

Figure 19:
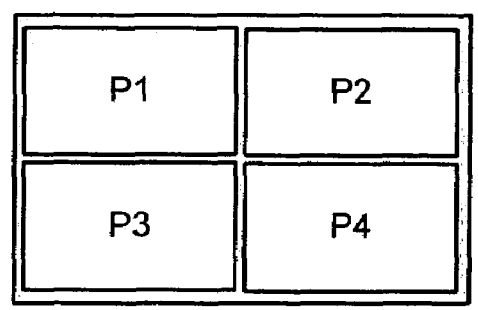

The results for more than two pages are the same. As can be seen in the landscape-orientation example of FIG. 19, because the horizontal side was the longest after splitting into two pages, (as in FIG. 17), the next split made is horizontal, resulting in the layout of pages P1-P4, as shown in FIG. 19. If the user wanted more than four pages, to split these, it can be seen that next time a vertical split would be performed, and so on, depending on the width versus height comparisons until the number of desired pages (or more) is reached.

Turning to a consideration of mixed flow and fixed content pages, in one implementation, each row in the page grid can have one type or the other, i.e., flow or fixed content, but not a mix within the row. Although a mix within a row is straightforward to implement, it helps to differentiate fixed from flow from a user's perspective, which helps because the content often changes its theme with such a change. Another rule is that when there is a mix of type fixed and type flow, the pages are center aligned in the row, although again, other alignments are straightforward to implement in alternative models.

In general, the size of the pages displayed is based on the page containing the active focal point, which is either a default page such as the center (or first) page currently being shown, or the displayed page with which the user has most-recently interacted, e.g., via an insertion point or by active selection (marking content). It is also feasible to use mouse hover to determine the page having focus, although this may tend to confuse users.

In FIGS. 20-23, the active page is indicated by having a dashed box rather than a solid box represent it. If the active focal point is on a fixed page when the user requests a change that impacts the number of columns, then the new grid sizing is based on the fixed page's size, that is, flow pages will be set to the size of the fixed page. If the focal point is on a flow page, then the grid sizing is based on that flow page, which, as described above, may follow splitting. Once the size is determined, the various rules described above are used to create the page grid.

Figure 20:
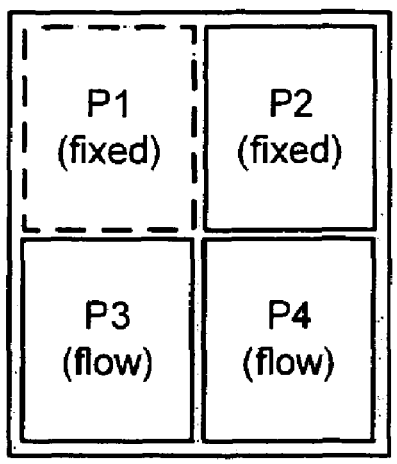
FIGS. 20-23 are representations of various layouts when a document contains fixed pages and pages of reflowable content, in accordance with various aspects of the invention.

FIG. 20 is a representation of a layout when a user requests to see four pages and the first two pages are fixed, followed by some amount of reflowable content. The page with the focal point (P1, shown via the dashed box) is used to size the grid.

Note that the zoom level applied is constant across both fixed and flow pages. This means that if the zoom level is reduced to some percentage for the fixed page, that same zoom level is applied to the reflowable content. When a flow page has the focal point, zoom is not applied as part of showing more pages; this means that fixed pages in the same document are not scaled.

Figure 21:
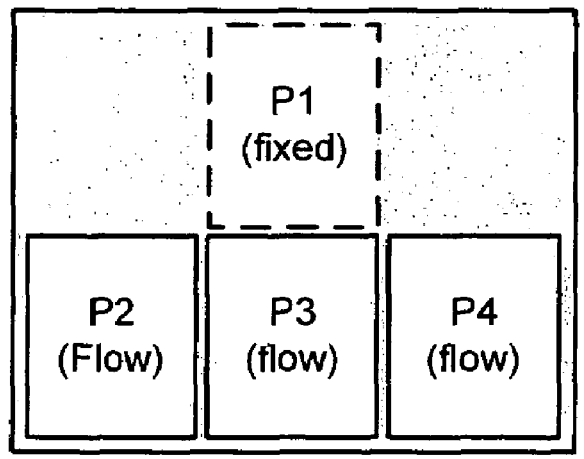

FIG. 21 is a representation of a layout when a user requests to see four pages and the first page is fixed, followed by some amount of reflowable content. The page with the focal point (P1, shown via the dashed box) is used to size the grid. Note that reflowable content does not appear in the same row with fixed content.

Figure 22:
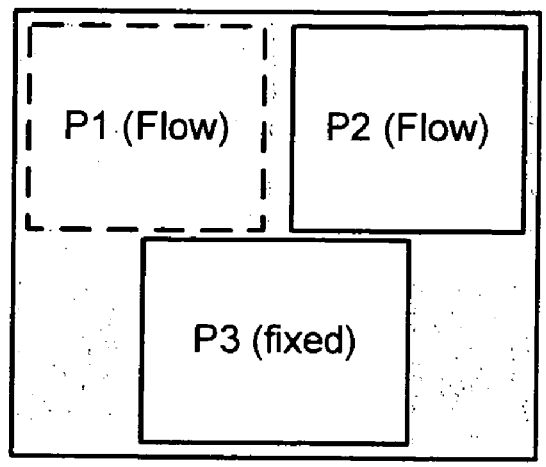

Another example, FIG. 22, shows the layout when a user requests to see four pages and the beginning content is flow, followed by some number of fixed pages. Consider that in this example, there is only enough reflowable content to fill two pages, and although during splitting, the available space was allocated for four, it is not desirable to show blank pages and thus the third and fourth flow pages, which would be blank, are removed, and the fixed content page becomes the third page P3. Because the flow page has focus, there is no zoom change and the fixed page P3 remains the same size, centered below.

Figure 23:
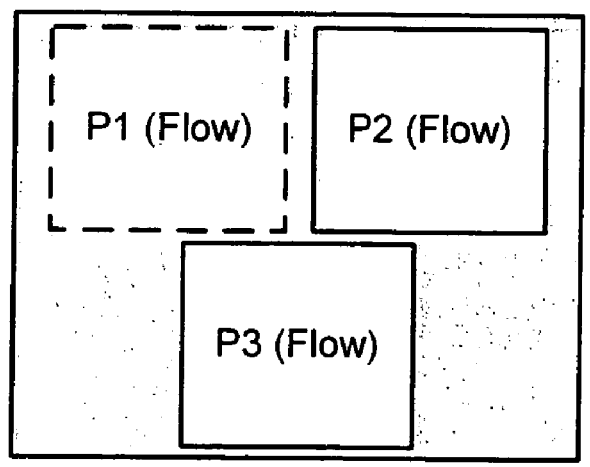

FIG. 23 provides another example layout, when the user requests to see four pages, and the beginning content is flow followed by some number of fixed pages. Consider that in this example, there is only enough reflowable content to fill three pages. Since fixed and flow are kept on separate lines, there are only three pages shown (center aligned); the user will have to scroll (or zoom out) to see the fourth (fixed) page.

Figure 24A:
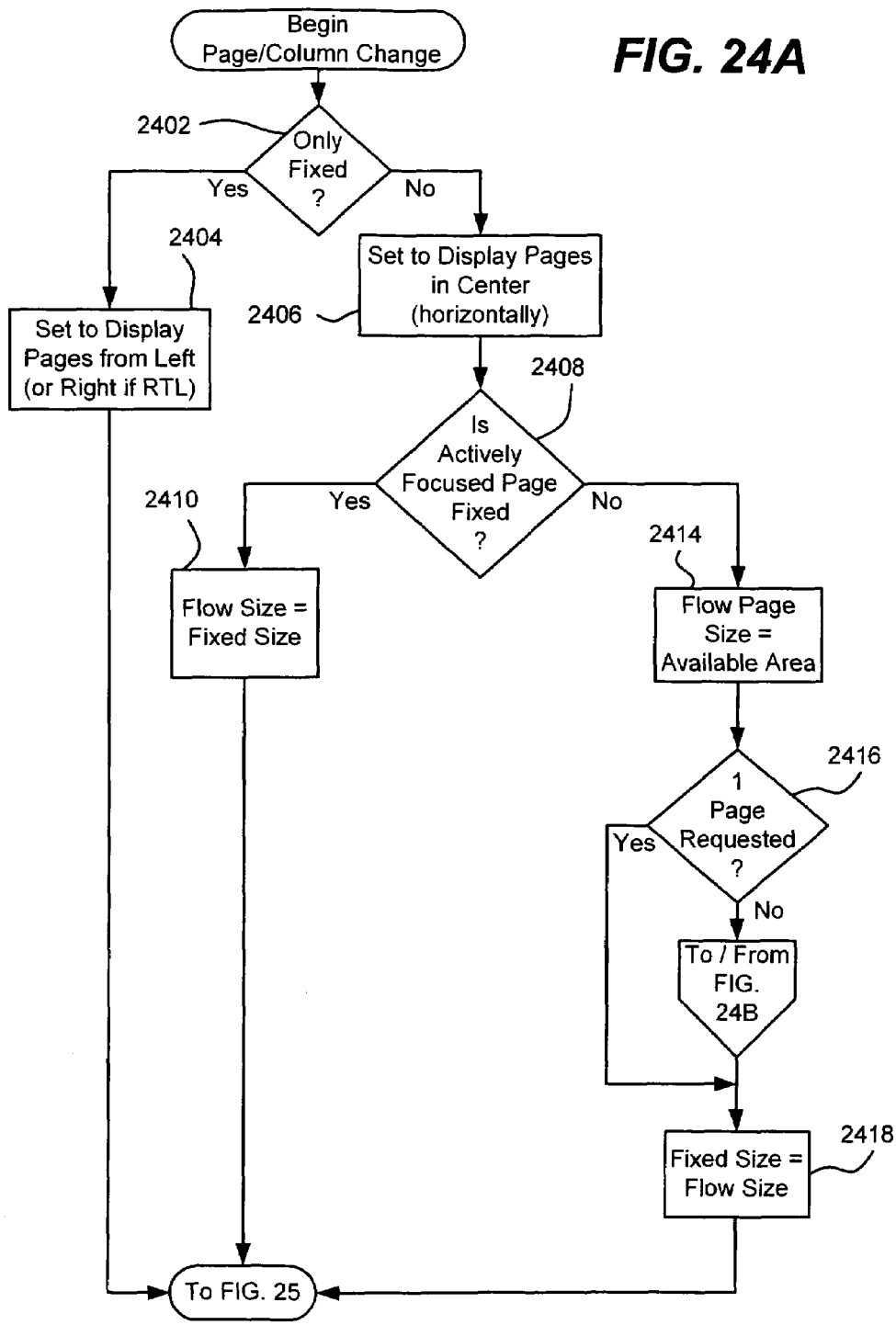
FIGS. 24A and 24B comprise a flow diagram representing preparing for a layout operation that depends on reflowable content and/or fixed content pages in a document in accordance with various aspects of the invention.
Figure 24B:
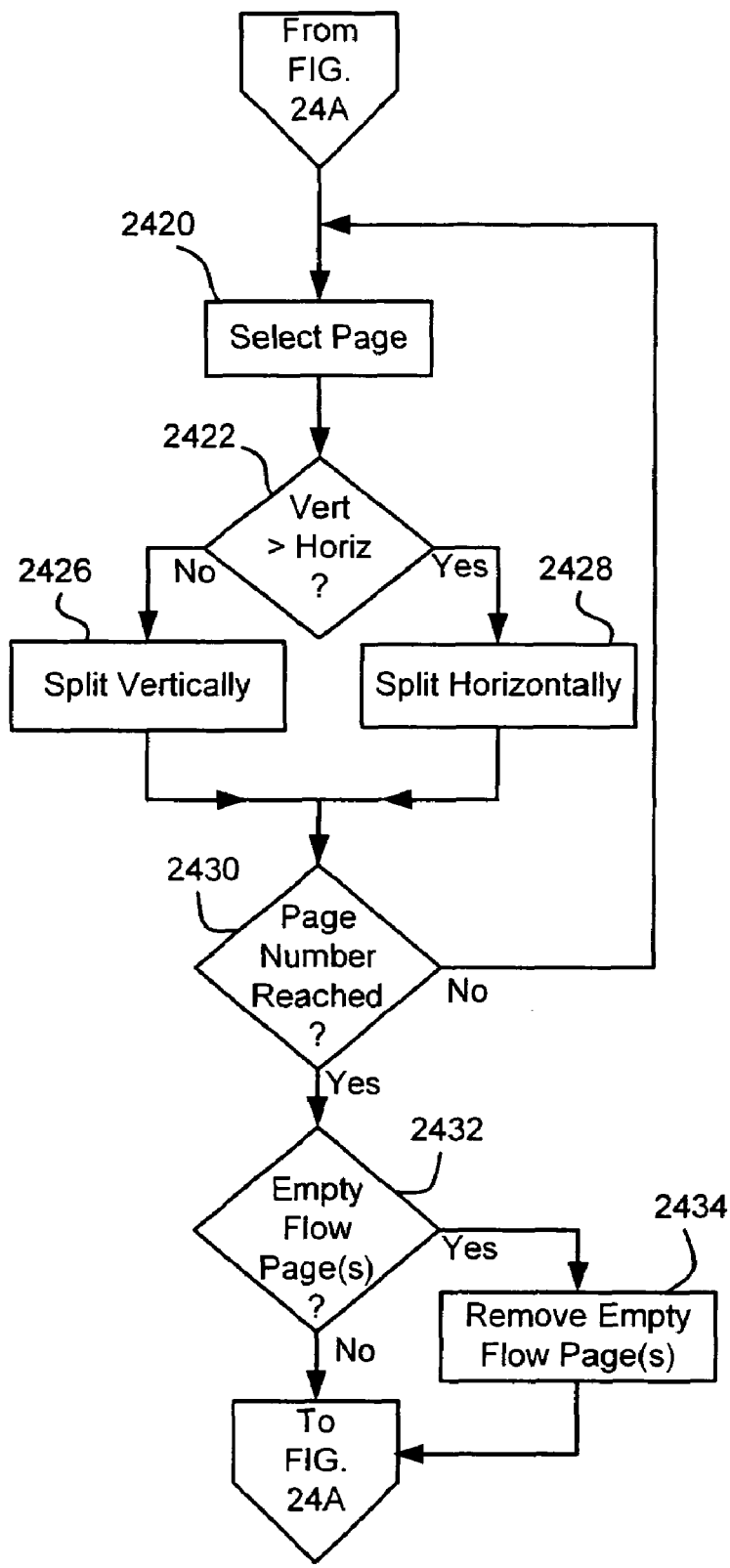

Turning to an explanation of the layout logic, FIG. 24A and 24B first represents setting up some of the rules and sizes when a new layout is required, e.g., when the user requests a change to the number of pages being displayed. Note that although FIGS. 24A and 24B may be considered as part of a grid layout process, this logic is somewhat more rule-dependent rather than dealing with laying out the grid, and thus FIGS. 24A and 24B are shown connecting as a separate flow diagram from that of the grid layout process FIGS. 25-27 rather than being integrated into it. Further, note that the user may request the same number as currently being shown, yet in one implementation layout may be redone, such as if the user is actively focused on one page such as in the middle of the viewport; the layout control may rearrange the layout so that the focused page is shown at the top left. Further note that the first time the user starts a document, layout is performed with whatever defaults or settings the user requests be saved, e.g., one column of pages.

In FIG. 24, a test at step 2402 evaluates whether there are only fixed pages. If so, step 2402 branches to step 2404 so that the display will show left-aligned pages starting from the left-to-right, (or right to left, e.g., depending on a user preference setting). The process then continues to FIG. 25 to layout the pages, as described below.

If at step 2402, there is a mix of fixed content pages and reflowable content pages, step 2406 is instead executed, which sets the pages to be center aligned (horizontally). Then, step 2408 looks at which page currently has active focus, as described above.

If at step 2408 the actively-focused page is fixed, step 2408 branches to step 2410 to set the page size for flow pages to the fixed page size, as described above. If instead the actively-focused page has reflowable content, step 2408 branches to step 2414 to determine the size of the flow page. In general, the flow size starts as the available area, as described above, and is then split from there as necessary to reach the desired number of pages.

Step 2416 first determines whether only one page has been requested; if so, no splitting of the reflowable content is needed, and step 2416 branches to step 2418 where the fixed page size is set to the flow page size, and the grid layout of FIG. 25 may begin. Otherwise, splitting is required, as represented via the steps of FIG. 24B.

In FIG. 24B, a page is selected at step 2420, which at first is the available area. The vertical dimension is compared to the horizontal dimension, and either split vertically via step 2426, or horizontally, via step 2428, as described above.

Step 2430 then tests whether the split resulted in the desired number (or more) pages being reached. If not the process returns to select a now-split page, and repeat the splitting process. If so, the splitting is over, and step 2432 is executed to determine if the reflowable content fills all of the split pages or whether there are empty ones. If any are empty, step 2434 removes them.

Returning to step 2418 of FIG. 24A, once the flow size is known after splitting, the fixed size is set to the flow size via step 2418, and the grid layout process begins, starting at step 2502 of FIG. 25.

Step 2502 represents the beginning of the grid layout process, e.g., initializing once the number of columns is known, which may have been determined by the logic of FIGS. 24A and 24B or other logic. Step 2504 determines whether all of the pages are fixed and of the same size, or whether there is a mix of sizes, and/or flow and fixed content pages. If so, the process continues to step 2506 where a row entry is created (e.g., a data structure in memory) to represent a row.

Step 2508 adds as many pages (columns) as requested to the row, starting from the first page in the document. Since in this branch of the process, all pages are the same size, the width of each page is essentially the available width divided by the number of columns, N, after accounting for spacing. Moreover, because the number of columns per row is the same for every row, if desired for an actively focused page to appear in a certain column in its row, such as at the first page location of its row, it is simple to calculate where to start the first page in the first row (e.g., the second column of three page column available). Once the pages (e.g., each page is identified by an identifier that is suitably unique to the document), step 2510 adds the row to the layout, essentially another data structure. Step 2512 repeats the process until each page of the document is in a row; note that step 2508 only added pages that exist, and thus, for example, if the user wants to see three columns of pages and there is not an exact multiple of three pages in the document, the remainder of pages are added to the last row, e.g., left-aligned (for left-to-right layout) as described above.

Returning to step 2504, in the event there are a mix of sizes, and/or flow and fixed content pages in the document, step 2504 instead takes the other main branch of FIG. 25, to step 2520 which sets the system to display pages horizontally centered. Then, step 2522 is executed, which essentially selects the page with active focus as the start of a "pivot row," (described below) and adds N pages to this row, (or as many remain in the document if not enough are available to fill the row). Note that a user may request a change when any page in the document has active focus; thus, the term "pivot" to indicate that this row is not necessarily the first row, and there are often rows above and below the pivot row. Further, note that if a flow page is not allowed in the same row as a fixed page, and thus reaching a different type of page is another way to terminate the row. Step 2524 calculates the width of this row, and sets it to a variable "W" which is used in FIGS. 26 and 27. The process then continues to FIG. 26.

Step 2602 represents testing whether there is any previous page in the document. If not, there are no pages and thus no rows above the pivot row, and the process continues to FIG. 27 to look for rows below the pivot row. If there is at least one page before the current row, currently the pivot row, step 2604 is executed, to create a new row in the layout for this previous page. Note that this row will be shown above the current row, which is the pivot row at this time, and thus the new row entry is appropriately positioned in the data structure representing the layout.

Step 2606 adds the previous page (e.g., an identifier thereof) to the new row. Note that for left to right layout, this page will be added before any other page on that row because the process is essentially walking upwards through previous pages on the row, e.g., if the pivot row contains pages P3 and P4, and previous pages P1 and P2 will fit on the prior row, P2 is processed first, followed later by P1's processing, and thus P1 will need to go before P2 in that row.

Step 2508 tests whether there is another previous page, that is, whether the start of the document has not yet been reached. If there is another previous page, step 2508 is executed, to determine whether a new row is needed for this page, or whether this previous page can fit on the same row. A row cannot mix type flow and type fixed, and thus this is one way that step 2610 will return to step 2604 to create a new row entry. The other time a new row is needed is when adding the new page to the row would make the row wider than W, which is the width of the pivot row; note that page widths are not predictable, because all pages may not be the same size. In either situation, step 2610 will return to step 2604 to create a new row entry. Otherwise, step 2610 returns to step 2606 to add the other previous page to the same row. Further, note that when step 2606 is executed, at least one page is added to the row, even if wider than W; to see the entire content of the page, the user will have to take some other action, e.g., horizontal scrolling, a change in zoom, make a request (page number change) that causes the grid to be regenerated, and so forth.

Eventually, the beginning of the document will be reached and there will be no other previous page to process, as detected by step 2608. At this time, the layout grid is set with the pages from the beginning of the document to the pivot row that contains the actively focused page plus any others up to the number of columns requested. Step 2608 branches to FIG. 27 to complete the rest of the document starting from the page after the pivot row, (if any).

It should be noted that it is possible to process pages from the pivot row downward to the end of the document, first, and then process them from the pivot row upward to the beginning of the document. However, an optimization is possible by processing upward first, then downward, because each row has a vertical offset (e.g., using pixels as units) that is calculated based on its row height. The beginning of the document is at a vertical offset of zero. Once the beginning of the document is reached, the zero point is known, and the other row offsets can be determined and set for each row in the grid, which is done after processing the pages before the pivot row. By finding the zero point and the vertical row offsets for rows up to and including the pivot row, before setting up the grid below the pivot row, there is no need to fix up the vertical offsets later, but rather they may be determined as each row is determined in the downward direction.

Step 272 tests whether there is at least one page after the pivot row's last page. If not, the layout grid is done, and the process ends, shown herein as taking place in FIG. 25 for completeness. If there is at least one page after the pivot row, step 3704 selects the first one as the next page to process. As can be seen, the loops of steps 2706, 2708, 2710 and 2712 are substantially identical to those described above, with exceptions including that because pages are being processed downwardly following the pivot row, row entries are added in the opposite direction to the grid layout, and page entries are, in a left-to-right layout, added to the row entry so as to follow previous pages. Thus, steps 2706 creates new rows as needed because of width limitations, or so as to not mix flow with fixed content pages in a row, as determined via step 2712, and pages are added to the current row entry (step 2708) until none remain (step 2710).

At this time, the layout grid is complete, and the document viewing control 204 can now use it to display the pages, e.g., starting with the pivot row at the top of the viewport, and horizontally center-aligned for mixed flow/fixed and or mixed-sized pages, or from the top of the viewport, horizontally left-aligned for fixed pages of the same size. Note that if more rows than the pivot row may be shown in the viewport, instead of showing the pivot row with the top left corner of the first page in the top left of the viewport, the pivot row may be vertically centered in the viewport, with rows above and below it being shown, at least in part. Even if vertically centering, however, when the first page of the document is in the pivot row, this row may be still shown starting in the top left corner; if the last page of the document is in the pivot row, the bottom of the tallest page in the pivot row may be at the bottom of the viewport.

Although layout has been described in one beneficial usage, other ways to use layout are advantageous. For example, layout may be used in a slideshow-like manner, in which only one row is shown at a time, regardless of vertical that is available. Actions other than viewing a number of pages/columns can retrigger regeneration of a layout, such as a fit-to-window option, certain other re-zooming options, and so forth.

As can be seen from the foregoing detailed description, there is provided a method and system that performs layout in a consistent and logical way, so that users viewing a document receive a satisfying viewing experience. The layout is based off of the actively-focused page, and handles fixed and/or reflowable content, and differently-sized or same sized pages.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method for visually distinguishing between pages having different types of content, the method comprising:
   receiving a request to display multiple pages of a document, the request indicating that the multiple pages should be displayed based on an identified column number representing at least one column;
   determining that the document includes pages having a first type of content;
   determining that the document also includes a pages having a second type of content; and
   laying out a page grid for displaying the pages having the first type of content and pages having the second type of content, including determining a page of the document that has active focus, and creating at least one page row in the page grid including a page row for the page that has active focus, wherein laying out the page grid further includes separating pages having the first type of content from pages having the second type of content, such that the pages having the second type of content will always be displayed in a different row of the page grid than pages with the first type of content, such that only pages having the same type of content are added to a same row such that a number of pages in the row matches the column number.

2. The method of claim 1 further comprising, determining that pages of the first content type of the document are of the same size as each other, and laying out the page grid by selecting each page of the first content type having the same size and adding that page to a row.

3. The method of claim 1 further comprising, determining that pages of the first content type of the document are not of the same size as each other, and establishing the page row for the page that has active focus as a pivot row, and further processing previous pages in the document to add one or more rows to the page grid that are logically before the pivot row, and processing pages in the document that are after pages in the pivot row to add one or more rows to the page grid that are logically after the pivot row.

4. The method of claim 3 wherein the column number is greater than one, and wherein establishing the page row for the page that has active focus as the pivot row comprises adding at least one other page to the pivot row to match the column number, the at least one other page necessarily having content of the same type as that of the page that has active focus.

5. The method of claim 4 wherein processing previous pages in the document to add one or more rows to the page grid comprises, selecting a page before a previous page added to a row as a selected page, determining whether adding the selected page to the row would cause the row to exceed a width determined for the pivot row, and if adding that page would exceed the width, creating a new row and adding the selected page to the new row.

6. The method of claim 1 further comprising, determining whether a mix exists with respect to pages in the document, and determining a horizontal alignment for at least one row based on whether a mix exists.

7. A computer-readable storage medium having computer-executable instructions tangibly embodied thereon, wherein the computer-executable instructions, when executed, perform the method of claim 1.

8. The method of claim 1, wherein determining that the document includes pages of a first type of content includes determining that the document includes pages of fixed content, and wherein determining that the document includes pages of a second type of content includes determining that the document also includes pages of reflowable content.

9. The method of claim 8, wherein fixed content does not flow to other pages, whereas reflowable content flows to fit in available pages.

10. The method of claim 9, wherein column widths in the page grid are set based on a page width for each page in each row, such that column widths can vary for pages having different widths.

11. The method of claim 10, wherein all pages in a row are collectively centered, such that columns overlap in rows having differently sized pages or having different numbers of pages.

12. The method of claim 9, wherein determining a page of the document that has active focus comprises determining that a page of fixed content has active focus, the method further comprising setting a size of all reflowable pages equal to the size of the page of fixed content having active focus.

13. In a computing environment, a system comprising:
   a document viewing component; and
   a layout component coupled to the document viewing component, the layout component including layout logic that determines a grid of pages for displaying content of a document, by creating rows of at least one page based on a request corresponding to a column number representing at least one column, and an actively focused page when the request is received, wherein the layout logic of the layout component further determines that pages of the document having same types of content can be included in a same row of the grid of pages, while pages of the document having different types of content will always be displayed in different rows of the grid of pages.

14. The system of claim 13 wherein the document viewing component comprises a control that is hosted by another program.

15. The system of claim 13 wherein the layout component comprises a control that is contained by the document viewing component.

16. The system of claim 13 wherein the layout logic further determines the grid of pages based on whether pages of the document are fixed content pages of the same size as each other.

17. The system of claim 16 wherein when the document does not contain fixed content pages of the same size as each other, the layout logic establishes a pivot row for the page that has active focus, processes previous pages in the document to add one or more rows to the page grid that are logically before the pivot row, and processes pages in the document that are after any page in the pivot row to add one or more rows to the page grid that are logically after the pivot row.

18. The system of claim 17 wherein the layout logic creates a new row when, if a page was added to a row, the row would exceed the width of the pivot row.

19. The system of claim 13 wherein the layout logic further determines the grid of pages based on whether pages of the document are a mix fixed content and reflowable content.

20. The system of claim 13 wherein the layout logic creates a new row to avoid mixing a page of fixed content and a reflowable content in the same row.

* * * * *

UNITED STATES PATENT AND TRADEMARK OFFICE
CERTIFICATE OF CORRECTION

| | | |
|---|---|---|
| PATENT NO. | : 7,412,647 B2 | Page 1 of 1 |
| APPLICATION NO. | : 11/073271 | |
| DATED | : August 12, 2008 | |
| INVENTOR(S) | : Timothy D. Sellers et al. | |

It is certified that error appears in the above-identified patent and that said Letters Patent is hereby corrected as shown below:

In column 16, line 61, in Claim 19, after "mix" insert -- of --.

In column 16, line 63, in Claim 20, after "and a" insert -- page of --.

Signed and Sealed this

Twenty-sixth Day of April, 2011

David J. Kappos
*Director of the United States Patent and Trademark Office*